US009815545B1

(12) United States Patent
Steer

(10) Patent No.: US 9,815,545 B1
(45) Date of Patent: Nov. 14, 2017

(54) AERODYNAMIC LIFTING SYSTEM

(71) Applicant: Steering Financial Ltd., St. Albert (CA)

(72) Inventor: David Steer, St. Albert (CA)

(73) Assignee: STEERING FINANCIAL LTD., St. Albert (CA)

( * ) Notice: Subject to any disclaimer, the term of this patent is extended or adjusted under 35 U.S.C. 154(b) by 0 days.

(21) Appl. No.: 15/444,757

(22) Filed: Feb. 28, 2017

(51) Int. Cl.
*B64C 3/14* (2006.01)
*B64C 39/02* (2006.01)
*B64C 29/00* (2006.01)

(52) U.S. Cl.
CPC .......... *B64C 3/141* (2013.01); *B64C 29/0008* (2013.01); *B64C 39/024* (2013.01); *B64C 2003/143* (2013.01); *B64C 2003/146* (2013.01); *B64C 2003/147* (2013.01)

(58) Field of Classification Search
CPC ................ B64C 3/141; B64C 29/0008; B64C 2003/146; B64C 2003/147; B64C 2003/143; B64C 21/025; B64C 21/04; B64C 21/08; B64C 2230/06; B64C 39/06; B64C 39/062; B64C 39/064; B64C 15/14
See application file for complete search history.

(56) References Cited

U.S. PATENT DOCUMENTS

| | | | | |
|---|---|---|---|---|
| 1,810,693 A | * | 6/1931 | Alfaro | B64C 21/02 244/204 |
| 2,075,817 A | | 4/1937 | Loerke | |
| 2,267,927 A | * | 12/1941 | Kightlinger | B64C 21/025 244/200 |
| 2,514,513 A | | 7/1950 | Price | |
| 2,809,793 A | | 10/1957 | Warner | |
| 2,910,254 A | | 10/1959 | Razak | |
| 2,946,541 A | * | 7/1960 | Boyd | B64C 21/00 244/130 |
| 3,144,220 A | * | 8/1964 | Kittelson | B64C 23/00 244/199.1 |
| 3,441,236 A | * | 4/1969 | Arnholdt | B64C 21/025 244/204 |
| 3,807,663 A | * | 4/1974 | Bartoe, Jr. | B64C 3/14 244/207 |
| 3,917,193 A | * | 11/1975 | Runnels, Jr. | B64C 9/24 244/134 B |

(Continued)

FOREIGN PATENT DOCUMENTS

DE 202011051844 U1 * 11/2011 ......... B64C 29/0066

*Primary Examiner* — Tien Q Dinh
*Assistant Examiner* — Alexander V. Giczy
(74) *Attorney, Agent, or Firm* — Burris Law, PLLC

(57) ABSTRACT

An aerodynamic lifting system for a VTOL aircraft is provided that includes a lifting structure defining a leading edge portion, a trailing edge portion, an upper surface extending between the leading edge portion and the trailing edge portion, and a lower surface extending between the leading edge portion and the trailing edge portion. A plurality of leading edge and trailing edge movable flaps, along with leading edge openings and trailing edge openings are employed to direct a flow of air, including along an upper surface of the lifting structure. During transition from a VTOL stage to forward flight, when a first leading edge movable flap is in a closed position, a net forward thrust is provided by the flow of air at the leading edge portion.

19 Claims, 3 Drawing Sheets

(56) References Cited

U.S. PATENT DOCUMENTS

| | | | |
|---|---|---|---|
| 4,117,995 A * | 10/1978 | Runge | B64C 9/146 244/130 |
| 4,391,424 A * | 7/1983 | Bartoe, Jr. | B64C 9/32 244/110 B |
| 4,398,688 A * | 8/1983 | Williams | B64C 3/50 244/207 |
| 4,804,155 A | 2/1989 | Strumbos | |
| 4,848,701 A * | 7/1989 | Belloso | B64C 9/146 244/12.5 |
| 5,016,837 A * | 5/1991 | Willis | B64C 21/04 244/12.1 |
| 5,687,934 A | 11/1997 | Owens | |
| 6,368,059 B1 * | 4/2002 | Maines | B63H 1/15 415/914 |
| 8,251,319 B2 | 8/2012 | Jonker et al. | |
| 8,262,031 B2 | 9/2012 | Zha et al. | |
| 8,485,476 B2 | 7/2013 | Zha et al. | |
| 2002/0139894 A1 * | 10/2002 | Sorensen | B60V 1/08 244/2 |
| 2007/0228222 A1 * | 10/2007 | Davis | B64C 3/141 244/207 |
| 2009/0014592 A1 * | 1/2009 | Zha | B64C 21/025 244/199.4 |
| 2009/0173834 A1 * | 7/2009 | Prince | B64C 23/06 244/198 |
| 2010/0127129 A1 | 5/2010 | Zha | |
| 2011/0001000 A1 * | 1/2011 | Zhu | B64C 3/141 244/12.1 |
| 2012/0043428 A1 * | 2/2012 | Goelling | B64C 9/18 244/208 |
| 2012/0237341 A1 | 9/2012 | Simon | |
| 2016/0009374 A1 * | 1/2016 | Glezer | G05D 7/01 244/99.13 |
| 2016/0368339 A1 * | 12/2016 | Nam | B60F 5/02 |

* cited by examiner

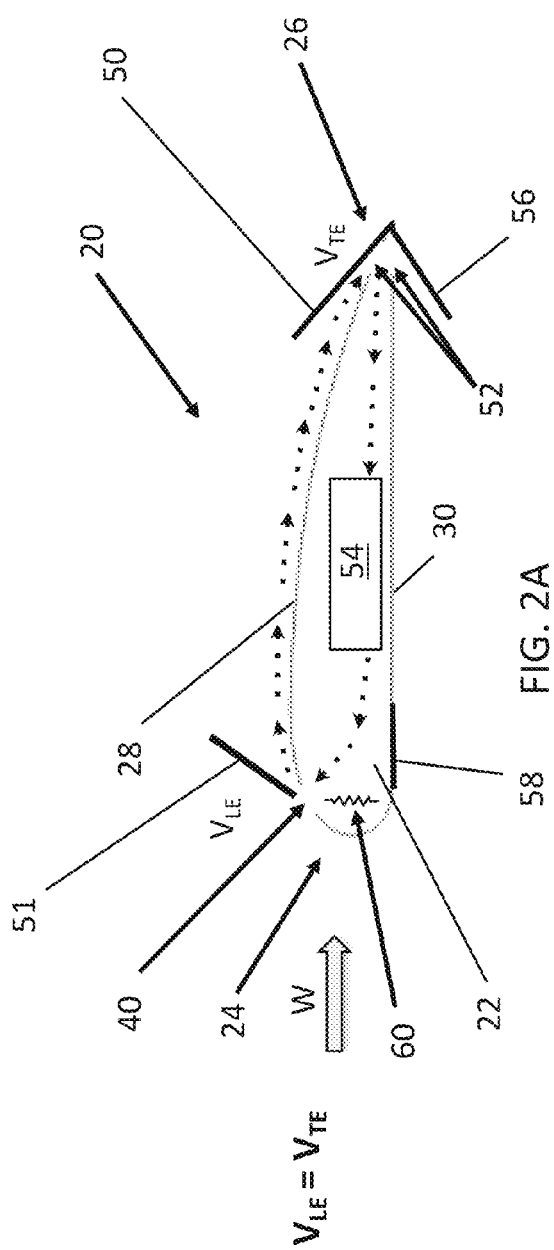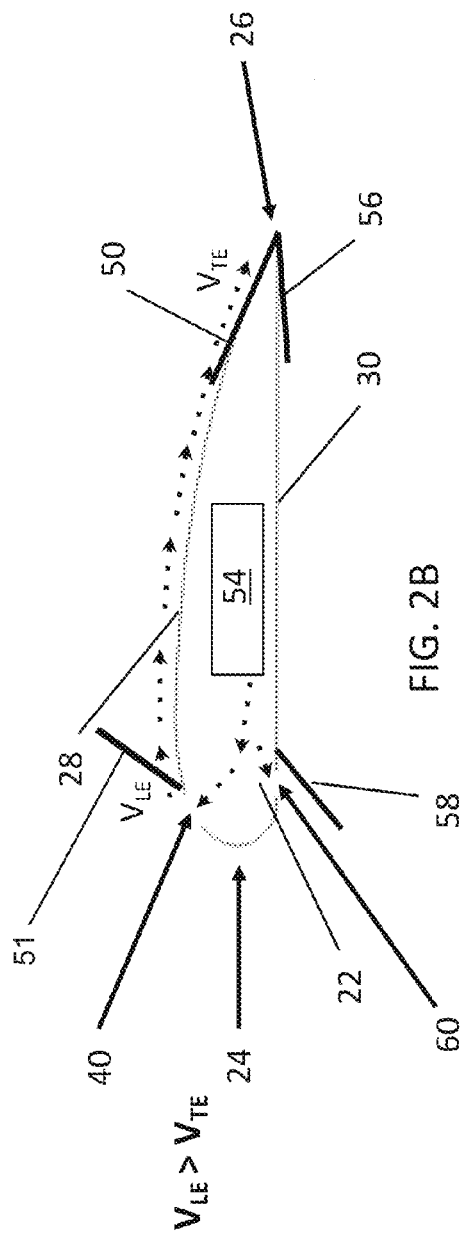
FIG. 2A
FIG. 2B

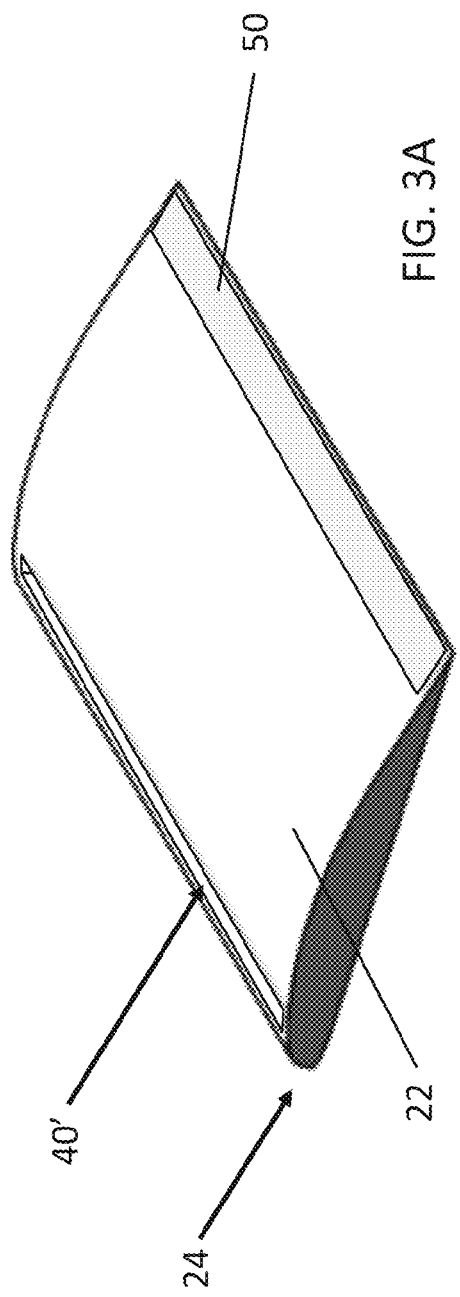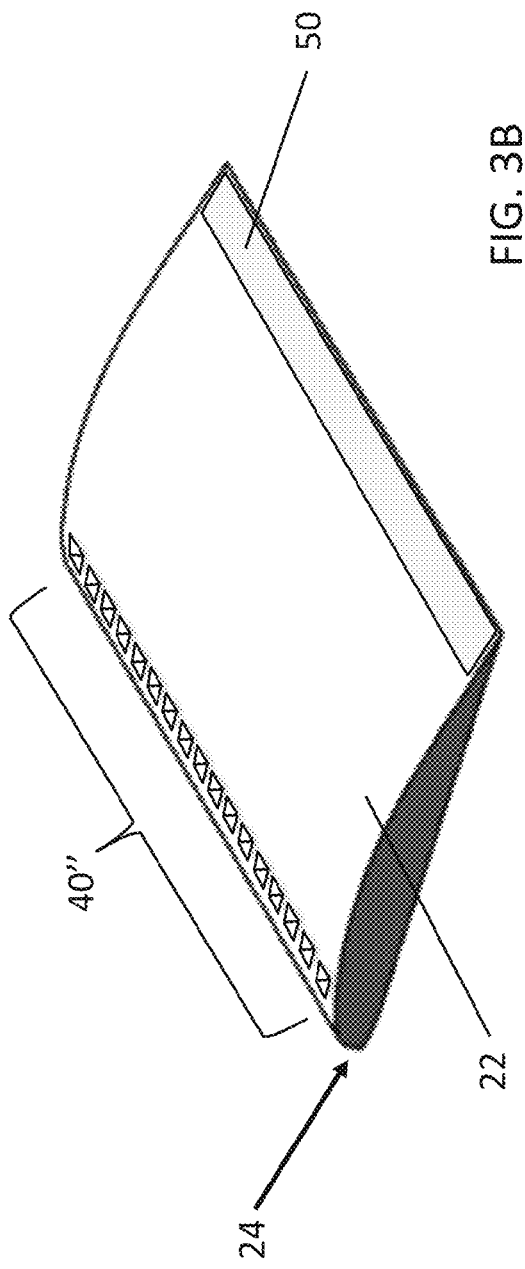

AERODYNAMIC LIFTING SYSTEM

FIELD

The present disclosure relates to the field of aerodynamics, and more particularly to VTOL (Vertical Take-Off and Landing) vehicles and systems for providing lift and thrust to such vehicles during vertical flight and during transition from vertical to forward flight.

BACKGROUND

The statements in this section merely provide background information related to the present disclosure and may not constitute prior art.

VTOL aircraft generally have extremely complicated systems to provide lift while the aircraft is hovering, or in a vertical flight stage, then to provide a combination of lift and thrust during a transition to forward flight, and then to provide thrust in a forward flight stage. For example, the V-22 "Osprey" aircraft, commonly referred to as a "Tiltrotor" aircraft can takeoff both conventionally and vertically, hover, and land both conventionally and vertically. The V-22 has proprotors at its wingtips, which function as propellers and rotors. The proprotors, engines, and gearboxes rotate from a forward flight position to the vertical hover/takeoff/land position. In a hover mode, the proprotors provide all lift and control with the required engine power being the highest when hovering. As the aircraft transitions to forward flight mode, the power and thrust of the engines are reduced since the wing generates more lift. Accomplishing both vertical and forward flight with this tiltrotor system can be considered a significant engineering accomplishment.

Another fascinating aircraft capable of both vertical and conventional forward flight was the AV-8B "Harrier," also commonly known as the "jump jet." The AV-8B was yet another engineering marvel that used pivoting/swiveling nozzles that took a portion of air ducted from its single Pegasus engine and directed thrust downwardly to create a hovering/vertical takeoff and landing configuration. As the aircraft would transition from vertical flight to forward flight, the nozzles would pivot from a downward configuration to an aft configuration, thus redirecting thrust from the engine, to transition to forward flight, and vice-versa to transition from forward flight to vertical flight. The Harrier also used ducted air off of the Pegasus engine that extended to its wingtips, nose, tail, and rudder to balance the aircraft during hover maneuvers.

Although these aircraft are incredibly versatile and impressive in their performance, they include extremely complicated systems that are costly and maintenance-intensive to support both vertical and conventional flight profiles. The industry is continually seeking ways to reduce complexity and cost while providing safety and reliability to VTOL aircraft.

SUMMARY

The present disclosure provides an aerodynamic lifting system for a VTOL aircraft comprising a lifting structure defining a leading edge portion, a trailing edge portion, an upper surface extending between the leading edge portion and the trailing edge portion, and a lower surface extending between the leading edge portion and the trailing edge portion. A slot is disposed along the leading edge portion of the lifting structure, the slot defining an opening configured for dispersing a flow of air towards the trailing edge portion. An upper trailing edge movable flap is disposed along the trailing edge portion of the lifting structure, the upper trailing edge movable flap defining an opening configured for capturing the flow of air from the slot. During a VTOL stage, a velocity of the flow of air at the leading edge portion is the same as a velocity of the flow of air entering the opening at the trailing edge portion when the upper trailing edge movable flap is in an open position, thereby resulting in a net zero forward thrust, and during transition from the VTOL stage to forward flight, when the upper trailing edge movable flap is in a closed position, a net forward thrust is provided by the flow of air at the leading edge portion.

In various forms of the present disclosure, which may be implemented individually or in combination:

the flow of air is provided by bleed air from an engine of the VTOL aircraft;

electric fans are configured to provide the flow of air;

the lifting structure is selected from the group consisting of a wing, an elevator, an elevon, a stabilator, a canard, and a fuselage;

the opening at the upper trailing edge movable flap extends through the upper surface and the lower surface;

the leading edge slot defines a continuous opening extending along a span of the lifting structure;

the trailing edge slot defines a continuous opening extending along a span of the lifting structure;

the leading edge slot defines a plurality of openings extending along a span of the lifting structure;

the trailing edge slot defines a plurality of openings extending along a span of the lifting structure;

at least one heater is disposed proximate at least one of the leading edge opening and the trailing edge opening for deicing; and the trailing edge opening defines an angle up to 90 degrees relative to the upper surface of the lifting structure at the trailing edge opening. The trailing edge opening may extend beyond 90 degrees in specific flight conditions, for example with a headwind, which is described in greater detail below.

In another form of the present disclosure, a VTOL aircraft having the aerodynamic lifting system as set forth herein is provided. In one form, the VTOL aircraft is unmanned.

In still another form, the movable flaps are controlled by a flight computer. An upper leading edge movable flap is also provided at the leading edge portion of the lifting structure. Further, a rate of flow of air through the slot is controlled to adjust a magnitude of the net forward thrust.

The present disclosure is also not limited to airflow for aircraft and thus its teachings may be applied to any lifting body/surface with a fluid flow (liquid, gas, plasma, among others). Accordingly, in another form, an aerodynamic lifting system is provided that comprises a lifting structure defining a leading edge portion, a trailing edge portion, an upper surface extending between the leading edge portion and the trailing edge portion, and a lower surface extending between the leading edge portion and the trailing edge portion. A slot is disposed along the leading edge portion of the lifting structure, the slot defining an opening configured for dispersing a flow of fluid towards the trailing edge portion. An upper trailing edge movable flap is disposed along the trailing edge portion of the lifting structure, the upper trailing edge movable flap defining an opening configured for capturing the flow of fluid from the slot. During a first stage, a velocity of the flow of fluid at the leading edge portion is the same as a velocity of the flow of air entering the opening at the trailing edge portion when the upper trailing edge movable flap is in an open position, thereby resulting in a net zero forward thrust. During transition from the first stage to forward movement, when the upper trailing edge movable flap is in a closed position, a net forward thrust is provided by the flow of fluid at the leading edge portion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 2A is a cross-sectional view of the aerodynamic lifting system taken along line 2-2 of FIG. 1 in a VTOL mode, and a schematic representation of related subsystems constructed according to the teachings of the present disclosure;

FIG. 2B is a cross-sectional view of the aerodynamic lifting system taken along line 2-2 of FIG. 1 in a transition from VTOL to forward flight, and the schematic representation of related subsystems constructed according to the teachings of the present disclosure;

FIG. 3A is a perspective view of one form of the aerodynamic lifting system of FIG. 1 according to the teachings of the present disclosure; and FIG. 3B is a perspective view of an alternative form of the aerodynamic lifting system of FIG. 1 according to the teachings of the present disclosure.

Figure 1:
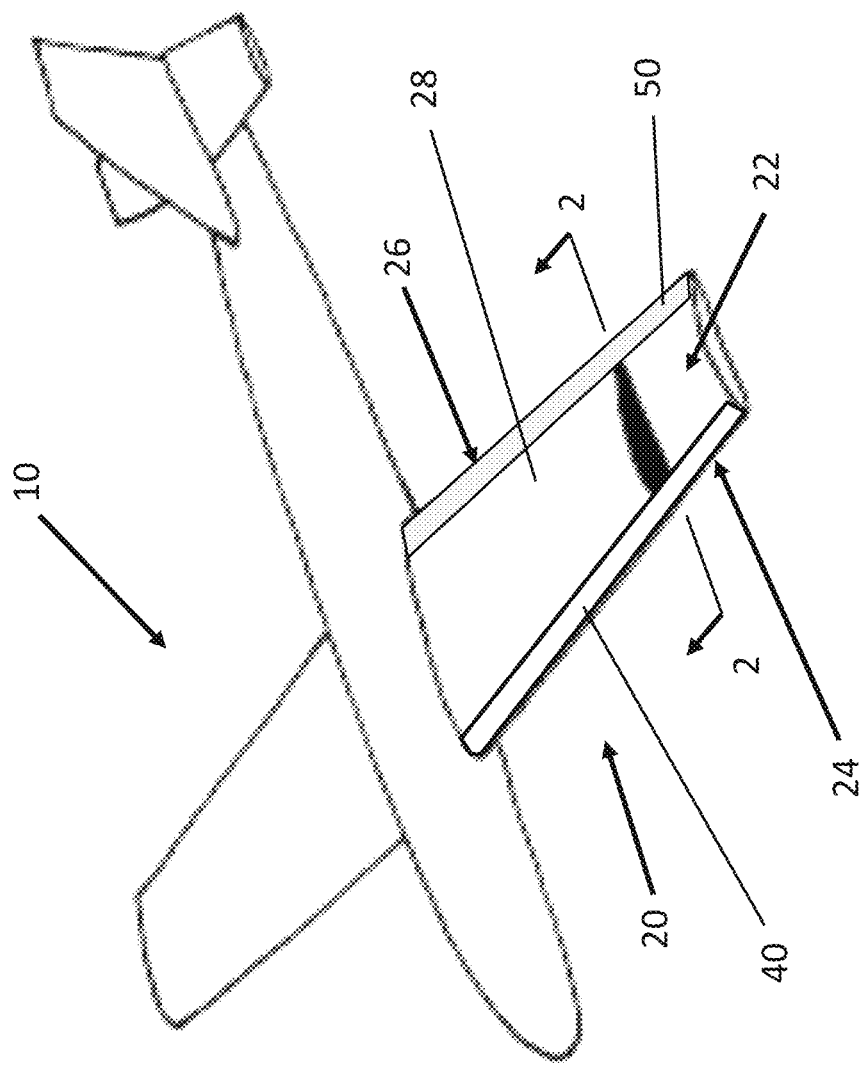
FIG. 1 is a perspective view of a VTOL aircraft having an aerodynamic lifting system constructed according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIGS. 1 and 2A-2B, an aerodynamic lifting system for a VTOL aircraft 10 is illustrated and generally indicated by reference numeral 20. As shown, the aerodynamic lifting system 20 comprises a lifting structure 22 defining a leading edge portion 24, a trailing edge portion 26, an upper surface 28 extending between the leading edge portion 24 and the trailing edge portion 26, and a lower surface 30 extending between the leading edge portion 24 and the trailing edge portion 26. A leading edge slot 40 is disposed along the leading edge portion 24 of the lifting structure 22, and the leading edge slot 40 generally defines an opening configured for dispersing a flow of air towards the trailing edge portion 26. An upper trailing edge movable flap 50 is disposed along the trailing edge portion 26 of the lifting structure 20. As described in greater detail below, the upper trailing edge movable flap 50 is operable to expose a trailing edge opening 52, which is configured for capturing the flow of air from the slot 40. Although the trailing edge opening 52 is shown as extending through the upper surface 28, in another form, the trailing edge opening 52 also extends through the lower surface 30, in which case a lower trailing edge movable flap 56 is operable to expose the trailing edge opening 52. Further another movable flap, an upper leading edge movable flap 51 is also be employed at the leading edge portion 24 in order to assist with directing the flow of air as flight/lifting conditions may dictate as set forth in greater detail below.

During a VTOL stage as shown in FIG. 2A, a velocity $V_{LE}$ of the flow of air at the leading edge portion 24 is the same as a velocity $V_{TE}$ of the flow of air entering the trailing edge opening 52 at the trailing edge portion when the upper trailing edge movable flap 50 is in an open position, thereby resulting in a net zero forward thrust. The air being blown through the slot 40 may be provided by a number of devices 54, including but not limited to a pump with air ducts (not shown), bleed air from an engine of the VTOL aircraft 10, static ducts/ducting (without a pump) located within a leading edge of the lifting structure 22 or in another location such as along a fuselage, or electric fans, among others. In this VTOL stage, the upper trailing edge movable flap 50 may be oriented at an angle up to about 90 degrees relative to the upper surface 28 of the lifting structure 22 at the trailing edge opening 52. In another form, the upper trailing edge movable flap 50 may be oriented beyond 90 degrees when compensating for atmospheric conditions such as a headwind, or a wind vector W as indicated in FIG. 2A. In another form, a lower leading edge movable flap 58 is operable to expose an opening 60 to compensate for atmospheric conditions, such as by way example, a tailwind, thus providing reverse thrust.

As shown in FIG. 2B, during transition from the VTOL stage to forward flight, when the upper trailing edge movable flap 50 is moved towards a closed position, and a net forward thrust is provided by the flow of air at the leading edge portion 24. In one form, a rate of flow of air through the leading edge slot 40, and or an opening size of the slot 40, is controlled to adjust a magnitude of the net forward thrust. The upper leading edge movable flap 51 is employed with the slot 40 in order to further adjust the forward thrust vector. In still another form, the lower trailing edge movable flap 56 may open to provide supplemental intake air to device 54.

Although a wing of a VTOL aircraft 10 is illustrated and described, it should be understood that the teachings of the present disclosure may be applied to any lifting body, including but not limited to an elevator, an elevon, a stabilator, a canard, a fuselage, and a parachute, among others. Further, the present disclosure is not limited to an application with airflow and may also be applied to any fluid lifting application, wherein the fluid may be liquid, gas, or plasma. Such applications should be construed as being within the scope of the present disclosure.

Referring now to FIGS. 3A and 3B, various forms of the leading edge slot 40 are illustrated and described in greater detail. In FIG. 3A, the leading edge slot defines a continuous opening 40' extending along a span of the lifting structure 22. In FIG. 3B, the leading edge slot defines a plurality of openings 40" extending along a span of the lifting structure 22. In still another form, the leading edge slot 40 may be closed or have a variable opening size to adjust the net velocity vector. It should be understood that these variations of leading edge slots, among other geometric configurations for openings in the leading edge 24 should be construed as being within the scope of the present disclosure. Similarly, although not shown in FIGS. 3A/3B, the trailing edge opening 52 may be a continuous opening or have a plurality of openings while remaining within the scope of the present disclosure.

Referring back to FIG. 2A, the aerodynamic lifting system 20 may also include a heater 60 disposed proximate the leading edge 24 for de-icing purposes. Alternately, the airflow being provided through the leading edge slot 40 may be heated and provide a deicing function while remaining within the scope of the present disclosure.

In other forms of the present disclosure, the VTOL aircraft may be "manned" or "unmanned." The movable flaps 50/51/56/58 may be manually controlled, or alternately, controlled by a flight computer, or combinations thereof. The flight computer is configured to receive input from the flight controls and also from outside environmental conditions such as temperature, barometric pressure, wind speed, and wind direction, among others. Accordingly, the flight computer can adjust the position of the movable flaps 50/51/56/58, and also provide input to the air flow device 54 to adjust the mass flow rate of air being provided along the lifting structure 20 according to the desired amount of thrust or flight condition desired, e.g., hover, forward flight, reverse flight, maneuvering. Accordingly, the movable flaps 50/51/56/58 may be configured in any number and combination of positions, for example, completely closed, slightly open, completely open. Further, the term "closed" should not be construed to mean completely closed when a net forward thrust is being provided. Such variations should be construed as being within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aerodynamic lifting system for a VTOL aircraft comprising:
   an air flow device disposed within the aerodynamic lifting system to provide a flow of air;
   a lifting structure defining a leading edge portion, a trailing edge portion, an upper surface extending between the leading edge portion and the trailing edge portion, and a lower surface extending between the leading edge portion and the trailing edge portion;
   a slot disposed along the leading edge portion of the lifting structure, the slot defining a leading edge opening configured for dispersing the flow of air towards the trailing edge portion along the upper surface of the lifting structure;
   an upper trailing edge movable flap disposed along the trailing edge portion of the lifting structure at the upper surface, the upper trailing edge movable flap defining a trailing edge opening configured for capturing the flow of air from the slot;
   an upper leading edge movable flap disposed along the leading edge portion of the lifting structure at the upper surface, the upper leading edge movable flap cooperating with the slot to direct the flow of air;
   a lower trailing edge movable flap disposed along the trailing edge portion of the lifting structure at the lower surface and configured for capturing air flow along the lower surface of the lifting structure; and
   a lower leading edge movable flap disposed along the leading edge portion of the lifting structure at the lower surface,
   wherein during a VTOL stage, a velocity of the flow of air from the slot at the leading edge portion is the same as a velocity of the flow of air entering the trailing edge opening when the upper trailing edge movable flap is in an open position, thereby resulting in a net zero forward thrust, and
   wherein during transition from the VTOL stage to forward flight, when the upper trailing edge movable flap is in a closed position, a net forward thrust is provided by the flow of air from the slot.

2. The aerodynamic lifting system according to claim 1, wherein the flow of air is provided by bleed air from an engine of the VTOL aircraft.

3. The aerodynamic lifting system according to claim 1 further comprising electric fans configured to provide the flow of air.

4. The aerodynamic lifting system according to claim 1, wherein the lifting structure is selected from the group consisting of a wing, an elevator, an elevon, a stabilator, a canard, and a fuselage.

5. The aerodynamic lifting system according to claim 1, wherein the leading edge opening extends through the upper surface and the lower surface and is further configured to disperse at least a portion of the flow of air at the lower surface of the lifting structure.

6. The aerodynamic lifting system according to claim 1, wherein the leading edge opening is continuous and extends along a span of the lifting structure.

7. The aerodynamic lifting system according to claim 1, wherein the trailing edge opening is continuous and extends along a span of the lifting structure.

8. The aerodynamic lifting system according to claim 1, wherein the leading edge opening defines a plurality of openings extending along a span of the lifting structure.

9. The aerodynamic lifting system according to claim 1, wherein the trailing edge slot opening defines a plurality of openings extending along a span of the lifting structure.

10. The aerodynamic lifting system according to claim 1 further comprising at least one heater disposed proximate the leading edge opening.

11. The aerodynamic lifting system according to claim 1, wherein the movable flaps are controlled by a flight computer.

12. The aerodynamic lifting system according to claim 1, wherein the aerodynamic lifting system is configured to control at least one of a rate of flow of air through the slot or a size of the slot to adjust a magnitude of the net forward thrust.

13. A VTOL aircraft having the aerodynamic lifting system according to claim 1.

14. The VTOL aircraft according to claim 13, wherein the VTOL aircraft is unmanned.

15. An aerodynamic lifting system comprising:
   an air flow device disposed within the aerodynamic lifting system to provide a flow of air;
   a lifting structure defining a leading edge portion, a trailing edge portion, an upper surface extending between the leading edge portion and the trailing edge portion, and a lower surface extending between the leading edge portion and the trailing edge portion;
   a slot disposed along the leading edge portion of the lifting structure, the slot defining a leading edge opening configured for dispersing the flow of air towards the trailing edge portion along the upper surface of the lifting structure;
   an upper trailing edge movable flap disposed along the trailing edge portion of the lifting structure at the upper surface, the upper trailing edge movable flap defining a trailing edge opening configured for capturing the flow of air from the slot;

an upper leading edge movable flap disposed along the leading edge portion of the lifting structure at the upper surface, the upper leading edge movable flap cooperating with the slot to direct the flow of air;

a lower trailing edge movable flap disposed along the trailing edge portion of the lifting structure at the lower surface and configured for capturing air flow along the lower surface of the lifting structure; and a lower leading edge movable flap disposed along the leading edge portion of the lifting structure at the lower surface, wherein the aerodynamic lifting system is configured to operate in a vertical flight mode and a forward flight mode, wherein during the vertical flight mode, a velocity of the flow of air from the slot at the leading edge portion is the same as a velocity of the flow of air entering the trailing edge opening when the upper trailing edge movable flap is in an open position, thereby resulting in a net zero forward thrust, and wherein during transition from the vertical flight mode to the forward flight mode, when the upper trailing edge movable flap is in a closed position, a net forward thrust is provided by the flow of air from the slot.

16. The aerodynamic lifting system according to claim 15, wherein the lifting structure is selected from the group consisting of a wing, an elevator, an elevon, a stabilator, a canard, and a fuselage.

17. The aerodynamic lifting system according to claim 15, wherein the leading edge opening extends through the upper surface and the lower surface and is further configured to disperse at least a portion of the flow of air at the lower surface of the lifting structure.

18. The aerodynamic lifting system according to claim 15, wherein the leading edge opening defines at least one opening extending along a span of the lifting structure.

19. The aerodynamic lifting system according to claim 15, wherein the trailing edge opening defines at least one opening extending along a span of the lifting structure.

* * * * *